(12) United States Patent
Donner

(10) Patent No.: US 9,102,273 B1
(45) Date of Patent: Aug. 11, 2015

(54) WHEELED VEHICLE MOUNTING SYSTEM

(71) Applicant: William Donner, New London, MN (US)

(72) Inventor: William Donner, New London, MN (US)

(*) Notice: Subject to any disclaimer, the term of this patent is extended or adjusted under 35 U.S.C. 154(b) by 0 days.

(21) Appl. No.: 14/193,028

(22) Filed: Feb. 28, 2014

Related U.S. Application Data

(60) Provisional application No. 61/770,811, filed on Feb. 28, 2013.

(51) Int. Cl.
*B60R 9/10* (2006.01)
*B60R 9/00* (2006.01)

(52) U.S. Cl.
CPC .......................................... *B60R 9/00* (2013.01)

(58) Field of Classification Search
USPC .......... 280/762, 769; 224/402, 403, 405, 509, 224/531, 533, 537
See application file for complete search history.

(56) References Cited

U.S. PATENT DOCUMENTS

| | | | | |
|---|---|---|---|---|
| 4,437,597 | A * | 3/1984 | Doyle | 224/533 |
| 6,868,998 | B2 * | 3/2005 | Dean | 224/324 |
| 7,815,084 | B2 * | 10/2010 | Allen et al. | 224/537 |
| 8,113,398 | B2 * | 2/2012 | Sautter et al. | 224/497 |
| 2006/0108297 | A1 * | 5/2006 | Gay | 211/20 |
| 2013/0277404 | A1 * | 10/2013 | Heininger | 224/405 |

* cited by examiner

*Primary Examiner* — John Walters
(74) *Attorney, Agent, or Firm* — Dicke, Billig & Czaja, PLLC

(57) ABSTRACT

A wheeled vehicle mounting system that is capable of engaging a wheel on a wheeled vehicle when the wheeled vehicle is transported using a vehicle. The wheeled vehicle mounting system includes a main support, a retaining arm, a retaining arm control mechanism and a mounting bracket. The main support has a main support recess that is adapted to receive a front portion of the wheel. The retaining arm operably is attached to the main support for movement with respect to the main support. The retaining arm control mechanism controls movement of the retaining arm with respect to the main support between an open configuration and a closed configuration. The mounting bracket is attached to the main support for attaching the wheeled vehicle mounting system to the vehicle. The mounting bracket includes a mounting bracket recess that is adapted to receive a lower portion of the wheel.

18 Claims, 2 Drawing Sheets

WHEELED VEHICLE MOUNTING SYSTEM

REFERENCE TO RELATED APPLICATION

This application claims priority to U.S. Applic. No. 61/770,811, which was filed on Feb. 28, 2013. The contents of which are incorporated herein by reference.

FIELD OF THE INVENTION

The invention relates generally to systems that are used in conjunction with transporting vehicles. More particularly, the invention relates to a mounting system for transporting wheeled vehicles.

BACKGROUND OF THE INVENTION

There are many instances where it is desirable to transport a first vehicle such as a motorcycle on a second vehicle such as a pick-up. One of the primary concerns when transporting the first vehicle is to retain the first vehicle in a stationary relationship with respect to the second vehicle.

Such a situation not only reduces the potential of damage to the first vehicle and the second vehicle but also reduces the potential for damage to other objects in proximity to the first vehicle and the second vehicle as well as injury to persons in proximity to the first vehicle and the second vehicle.

A particular challenge with transporting motorcycles is that motorcycles typically have two wheels. As such, the motorcycles do not have the ability to stand in an upright position without the use of a retraining device. Another challenge with motorcycles is that the motorcycles are formed in a variety of heights and lengths.

SUMMARY OF THE INVENTION

An embodiment of the invention is directed to a wheeled vehicle mounting system that is capable of engaging a wheel on a wheeled vehicle such as a motorcycle when the wheeled vehicle is transported using another vehicle. The wheeled vehicle mounting system includes a main support, a retaining arm, a retaining arm control mechanism and a mounting bracket.

The main support has a main support recess that is adapted to receive a front portion of the wheel. The retaining arm is operably attached to the main support for movement with respect to the main support.

The retaining arm control mechanism controls movement of the retaining arm with respect to the main support between an open configuration and a closed configuration. The mounting bracket is attached to the main support for attaching the wheeled vehicle mounting system to the vehicle. The mounting bracket includes a mounting bracket recess that is adapted to receive a lower portion of the wheel.

Another embodiment of the invention is directed to a wheeled vehicle transportation system that includes a wheeled vehicle, a vehicle and a wheeled vehicle mounting system. The wheeled vehicle has a wheel.

The wheeled vehicle mounting system includes a main support, a retaining arm and a retaining arm control mechanism. The main support has a main support recess that is adapted to receive a front portion of the wheel. The main support is attached to the vehicle. The retaining arm is operably attached to the main support for movement with respect to the main support.

The retaining arm control mechanism controls movement of the retaining arm with respect to the main support between an open configuration and a closed configuration. When in the closed configuration, the wheeled vehicle mounting system retains the wheel in a substantially stationary position with respect to the vehicle.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated as they become better understood by reference to the following detailed description. The elements of the drawings are not necessarily to scale relative to each other. Like reference numerals designate corresponding similar parts.

DETAILED DESCRIPTION OF THE INVENTION

Figures 1, 2:
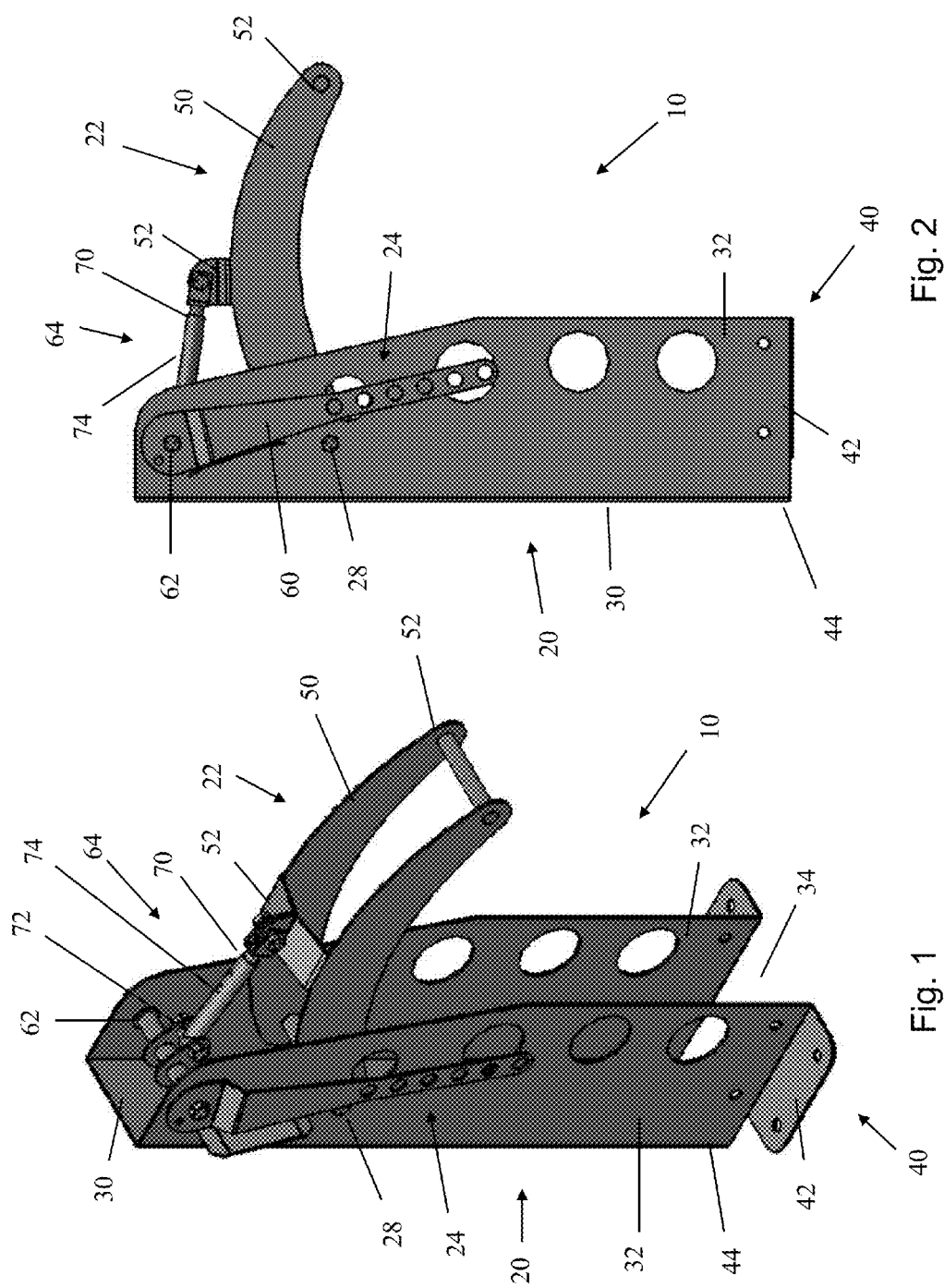
FIG. 1 is a perspective view of a wheeled vehicle mounting system according to an embodiment of the invention where the wheeled vehicle mounting system is in an open configuration.
FIG. 2 is a side view of the wheeled vehicle mounting system.

An embodiment of the invention is directed to a wheeled vehicle mounting system, which is illustrated at 10 in the drawings. The wheeled vehicle mounting system 10 is adapted for attachment to a vehicle 16 to thereby enable a wheeled vehicle 14 to be transported on the vehicle 16 while retaining the wheeled vehicle 14 in a substantially stationary position with respect to the vehicle 16.

The wheeled vehicle mounting system 10 enables the wheeled vehicle 14 to be quickly and securely attached to and detached from the vehicle 16. The wheeled vehicle mounting system 10 thereby minimizes the potential of damage to the wheeled vehicle 14 and the vehicle 16 while the wheeled vehicle 14 is being transported using the transport vehicle 16. The vehicle 16 may take a variety of forms using the concepts of the invention. Examples of suitable vehicles 16 include vans, pickups, trucks and trailers.

The wheeled vehicle mounting system 10 is movable between an open configuration and a closed configuration. When the wheeled vehicle mounting system 10 is in the closed configuration, the wheeled vehicle mounting system 10 engages a wheel 12 on a wheeled vehicle 14 and thereby prevents the wheel 12 from moving with respect to the wheeled vehicle mounting system 10.

The wheeled vehicle mounting system 10 generally includes a main support 20 and a retaining arm 22. In certain embodiments, the main support 20 is intended to be mounted in a generally vertical orientation as illustrated in the drawings.

The main support 20 may have a generally U-shaped profile that is defined by a central section 30 and a two side sections 32 that extend from opposite edges of the central section 30. In addition to enhancing the strength of the main support 20, this configuration provides a recess 34 that is adapted to at least partially receive the wheel 12.

One factor in selecting a height of the main support 20 is the height of the wheel 12. The main support 20 may be formed with a height that is greater than the height of the wheel 12. In certain embodiments, the height of the main support 20 is between about 2 feet and about 4 feet.

A width of the main support 20 may be slightly larger than the width of the wheel 12 so that a recess 34 between the side sections 32 is adapted to receive the wheel 12 while substantially restricting lateral movement of the wheel 12 with respect to the main support 20. In certain embodiments, the width of the main support 20 is up to about 6 inches.

A width of the side sections 32 may be selected to reduce the potential of the wheel 12 becoming disengaged from the wheeled vehicle mounting system 10. In certain embodiments, the width of the side sections 32 is between about 2 inches and about 12 inches.

Figure 3:
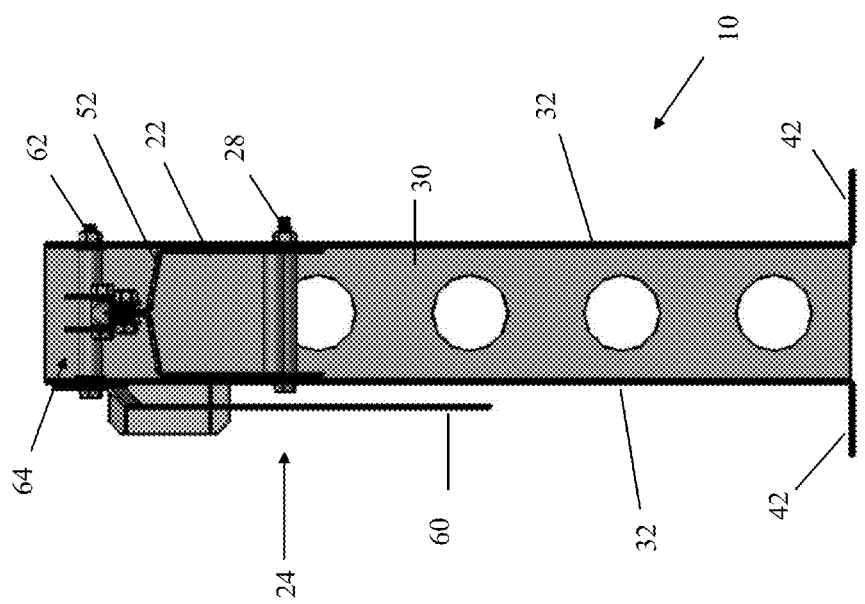
FIG. 3 is a front view of the wheeled vehicle mounting system.

Depending on the location where it is desired to use the wheeled vehicle mounting system 10, a mounting bracket 40 may be provided proximate a lower end of the main support 20, as illustrated in FIGS. 1-3. The mounting bracket 40 may be attached to the side sections 32.

A length of the mounting bracket 40 may be greater than the width of the side sections 32 to enhance stability of the wheeled vehicle mounting system 10 by restricting forward to back pivoting of the wheeled vehicle mounting system 10. In certain embodiments, the length of the mounting bracket 40 is at least twice as long as the width of the side sections 32. In other embodiments, the length of the mounting bracket 40 is between about 12 inches and about 36 inches.

The mounting bracket 40 may be formed with a generally L-shaped configuration that includes a first leg 42 and a second leg 44. In certain embodiments, the first leg 42 and the second leg 44 may be oriented generally perpendicular to each other.

The first leg 42 may have at least one aperture (not shown) formed therein so that a fastening device such as a bolt may be extended through the aperture for attaching the mounting bracket 40 to the vehicle 16. A person of skill in the art will appreciate that a variety of techniques may be used to attach the wheeled vehicle mounting system 10 to the vehicle 16.

In certain embodiments, the wheeled vehicle mounting system 10 is detachably mounted to the vehicle 16 such as with fasteners. In other embodiments, the wheeled vehicle mounting system 10 is permanently mounted to the vehicle 16 such as by welding.

A second leg 44 of the mounting bracket 40 may facilitate attaching the mounting bracket 40 to the side sections 32. The second leg 44 may also facilitate aligning the wheel 12 as the wheeled vehicle 14 is being moved into the wheeled vehicle mounting system 10 as well as to substantially restrict lateral movement of the wheel 12 with respect to the mounting bracket 40.

The retaining arm 22 is operably attached to the main support 20. In certain embodiments, the retaining arm 22 is pivotally mounted to the main support 20 using an attachment mechanism 28 such as a bolt that permits the retaining arm 22 to pivot between the open configuration and the closed configuration.

The retaining arm 22 includes two side panels 50 that are mounted in a spaced-apart configuration. One factor in selecting a distance between the side panels 50 is the width of the wheel 12 that is to be used in conjunction with wheeled vehicle mounting system 10. The spacing between the side panels 50 may be slightly greater than the width of the wheel 12 so that when the wheeled vehicle mounting system 10 is in the closed configuration, the retaining arm 22 substantially restricts lateral movement of the wheel 12. In certain embodiments, the spacing is between about 1 inch and about 6 inches.

In certain embodiments, the side panels 50 may be curved as illustrated in the figures. A curvature of the side panels 50 may be similar to a curvature of the wheel 12 that is to be used in conjunction with the wheeled vehicle mounting system 10.

A length of the retaining arm 22 may be selected based upon a diameter of the wheel 12. In certain embodiments, the length of the retaining arm 22 is greater than one-half of the diameter of the wheel 12. In other embodiments, the length of the retaining arm 22 is between about 60 percent and about 90 percent of the diameter of the wheel 12.

At least one cross-member 52 extends between the side panels 50 and thereby maintains the side panels 50 in a substantially stationary relationship with respect to each other. In certain embodiments, there are at least two cross-members 52 that extend between the side panels 50. One of the cross-members 52 may be attached to the side panels 50 proximate a distal end thereof. Another one of the cross-members 52 may be attached at an intermediate location on the side panels 50.

The cross-members 52 are attached to the side panels 50 above a lower surface of the side panels 50 so that the side panels 50 and the at least one cross-member define a recess. When the retaining arm 22 is in the closed configuration, a portion of the side panels 50 extends along the sides of the wheel 12 to thereby restrict lateral movement of the wheel 12 when the wheel 12 is retained in the wheeled vehicle mounting system 10.

The retaining arm 22 is operably attached to the main support 20 proximate an upper end thereof. In certain embodiments, the retaining arm 22 is pivotally attached to the main support 20.

The wheeled vehicle mounting system 10 also includes a retaining arm control mechanism 24 that controls movement of the retaining arm 22 with respect to the main support 20. The retaining arm control mechanism 24 may utilize an eccentric mechanism that not only moves the retaining arm between the open configuration and the closed configuration but also resists the retaining arm 22 moving from the closed configuration.

The retaining arm control mechanism 24 may include a control arm 60, a mounting shaft 62 and an engagement shaft 64. The control arm 60 is used by a user to move the wheeled vehicle mounting system 10 between the open configuration and the closed configuration. A proximal end of the control arm 60 may be attached to the mounting shaft 62. Alternatively, it is possible to use at least one gear to operably attach the control arm 60 to the mounting shaft 62.

The control arm 60 may be formed with a length that is sufficiently long to provide the user with sufficient leverage to move the retaining arm 22 into engagement with the wheel 12. In certain embodiments, the control arm 60 has a length of between about 6 inches and about 18 inches.

The control arm 60 may include an offset so that the distal end of the control arm 60 is further away from the side sections 32 than the proximal end of the control arm 60. Using such a configuration enables the user to move the control arm 60 while minimizing the potential of the user's hand contacting the side sections 32 during such movement. In certain embodiments, the offset is between about 1 inch and about 3 inches.

The mounting shaft 62 extends between the side sections 32. The mounting shaft 62 is rotatable with respect to the side sections 32 using the control arm 60, which is attached to at least one of the ends of the mounting shaft 62. In certain embodiments, the mounting shaft 62 is substantially cylindrical and is mounted for rotation about an axis thereof.

In certain embodiments, the engagement shaft 64 extends between the mounting shaft 62 and one of the cross-members 52. The engagement shaft 64 includes at least two sections that enable a length of the engagement shaft 64 to be varied.

In certain embodiments, the engagement shaft 64 includes a first end portion 70, a second end portion 72 and an intermediate portion 74. The first end portion 70 is operably attached to the mounting shaft 62. Opposite the mounting shaft 62, the first end portion 70 may have an interior threaded region 80. The second end portion 72 is operably attached to the cross-member 52. Opposite the cross-member 52, the second end portion 72 may have an interior threaded region 82.

The intermediate portion 74 may have a threaded outer surface proximate opposite ends thereof and the threaded outer surface is capable of engaging the interior threaded region 80 and the interior threaded region 82. Rotating the intermediate portion 74 with respect to the first end portion 70 and the second end portion 72 enables a length of the engagement shaft 64 to be changed. Changing the length of the engagement shaft 64 may be desirable when the wheeled vehicle mounting system 10 is used in conjunction with wheels 12 having different diameters.

As illustrated in FIG. 2, the attachment of the engagement shaft 64 to the mounting shaft 62 is offset from a rotational axis of the mounting shaft 62. Rotation of the mounting shaft 62 thereby causes the retaining arm 22 to be pivoted with respect to the main support 20.

The wheeled vehicle mounting system 10 may also include a locking mechanism 84 that engages the control arm 60 and at least one of the side sections 32 to prevent the control arm 60 from moving with respect to the side sections 32 when the retaining arm 22 is in the closed configuration. In certain embodiments, the locking mechanism 84 is a pin that extends through an aperture in the control arm 60 and one of the side sections 32.

The components of the wheeled vehicle mounting system 10 may be fabricated from a relatively strong material so that the wheeled vehicle mounting system 10 resists deformation while the wheeled vehicle mounting system 10 is used to transport the wheeled vehicle 14.

The desired strength of the wheeled vehicle mounting system 10 may be affected by factors such as the size and weight of the wheeled vehicle 14 that is being used in conjunction with the wheeled vehicle mounting system 10. In certain embodiments, the wheeled vehicle mounting system 10 is fabricated from a metallic material such as steel.

Figure 4:
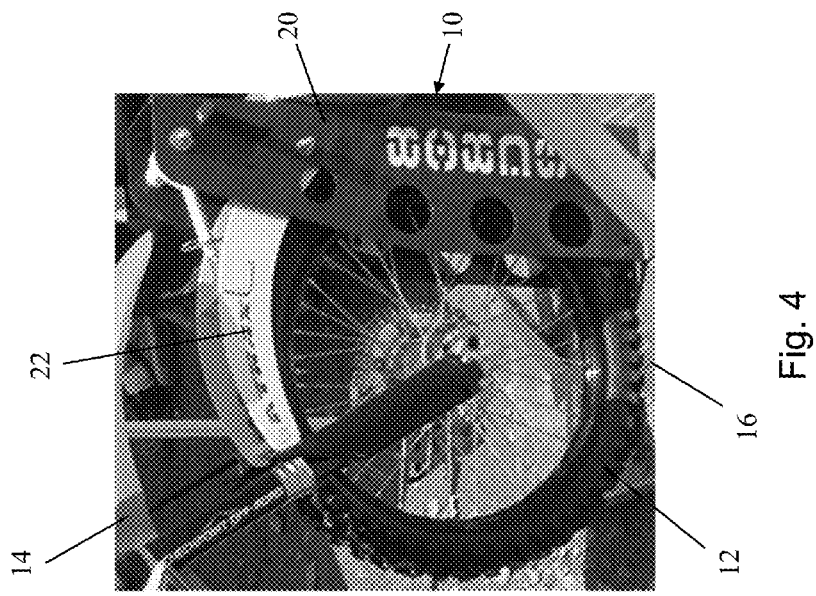
FIG. 4 is a side view of the wheeled vehicle mounting system in a closed configuration engaging a wheel on a wheeled vehicle.

While FIG. 4 illustrates the use of the wheeled vehicle mounting system 10 in the bed of a pickup, it is possible for the concepts of the invention to be used in other situations where a vehicle is transported. Rather than mounting the wheeled vehicle mounting system 10 directly to the transport vehicle, it is possible to attach the wheeled vehicle mounting system 10 to a skid. Such a configuration would enable the wheeled vehicle to be lifted such as using a forklift.

In operation, the wheeled vehicle mounting system 10 is attached to a vehicle such as a pickup bed using a plurality of fasteners. The control arm 60 is pivoted upwardly to cause the retaining arm 22 to pivot to the open configuration as illustrated in FIG. 1.

The wheel 12 on the wheeled vehicle 14 is rolled into the recess between the mounting brackets 40 until a front portion of the wheel 12 is in the recess 34 in the main support 20. The control arm 60 is pivoted downwardly until an upper portion of the wheel 12 is between the side panels 50 and the cross members 52 are in contact with the upper portion of the wheel 12.

The inflated nature of the wheel 12 causes the upper portion of the wheel 12 to be slightly depressed by the contact with the cross members 52. The eccentric nature of the retaining arm control mechanism 24 causes the control arm 60 to resist pivoting upwardly once the retaining arm 22 is in the closed configuration. If desired, the lock mechanism 84 can also be engaged.

While the preceding description is provided with respect to the use of the wheeled vehicle mounting system 10 in conjunction with transporting a wheeled vehicle, it is possible to use the wheeled vehicle mounting system 10 for transporting other vehicles. An example of one such alternative vehicle is a bicycle.

In the preceding detailed description, reference is made to the accompanying drawings, which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments can be positioned in a number of different orientations, the directional terminology is used for purposes of illustration and is in no way limiting.

It is to be understood that other embodiments may be utilized and structural or logical changes may be made without departing from the scope of the present invention. The preceding detailed description, therefore, is not to be taken in a limiting sense, and the scope of the present invention is defined by the appended claims.

It is contemplated that features disclosed in this application, as well as those described in the above applications incorporated by reference, can be mixed and matched to suit particular circumstances. Various other modifications and changes will be apparent to those of ordinary skill.

The invention claimed is:

1. A wheeled vehicle mounting system that is capable of engaging a wheel on a wheeled vehicle when the wheeled vehicle is transported using a vehicle, wherein the wheeled vehicle mounting system comprises:
    a main support having a main support recess that is adapted to receive a front portion of the wheel;
    a retaining arm operably attached to the main support for movement with respect to the main support;
    a retaining arm control mechanism that is operably attached to the main support and the retaining arm, wherein the retaining arm control mechanism controls movement of the retaining arm with respect to the main support between an open configuration and a closed configuration and wherein the retaining arm control mechanism comprises:
        a mounting shaft operably attached to the main support, wherein the mounting shaft is rotatably mounted to the main support for rotation about a rotational axis of the mounting shaft;
        a control arm attached to the mounting shaft; and
        an engagement shaft operably attaching the mounting shaft to the retaining arm, wherein attachment of the engagement shaft to the mounting shaft is offset from the rotational axis; and
    a mounting bracket attached to the main support for attaching the wheeled vehicle mounting system to the vehicle, wherein the mounting bracket includes a mounting bracket recess that is adapted to receive a lower portion of the wheel.

2. The wheeled vehicle mounting system of claim 1, wherein the main support comprises a central section and a pair of side section that define the main support recess and wherein the main support recess substantially restricts lateral movement of the wheel with respect to the main support when the front portion of the wheel is in the main support recess.

3. The wheeled vehicle mounting system of claim 1, wherein the mounting bracket recess substantially restricts lateral movement of the wheel with respect to the mounting bracket when the lower portion of the wheel is in the mounting bracket recess.

4. The wheeled vehicle mounting system of claim 1, wherein the retaining arm comprises:
- two side panels in a spaced-apart configuration, wherein a distance between the side panels facilitates receiving a top portion of the wheel there between while substantially restricting lateral movement of the wheel with respect to the retaining arm when the top portion of the wheel is between the side panels; and
- at least one cross member that extends between the side panels.

5. The wheeled vehicle mounting system of claim 4, wherein the at least one cross member is attached to the two side panels above a lower surface of the two side panels so that the at least one cross member and the two side panels define a retaining arm recess.

6. The wheeled vehicle mounting system of claim 1, wherein the retaining arm has a length that is greater than about 50 percent of a diameter of the wheel.

7. The wheeled vehicle mounting system of claim 1, wherein a length of the engagement shaft is variable.

8. The wheeled vehicle mounting system of claim 1, and further comprising a locking mechanism that prevents the retaining arm from moving with respect to the main support.

9. The wheeled vehicle mounting system of claim 1, wherein the wheeled vehicle is a motorcycle or a bicycle.

10. A wheeled vehicle transportation system comprising:
- a wheeled vehicle having a wheel;
- a vehicle; and
- a wheeled vehicle mounting system comprising:
  - a main support having a main support recess that is adapted to receive a front portion of the wheel, wherein the main support is attached to the vehicle;
  - a retaining arm operably attached to the main support for movement with respect to the main support; and
  - a retaining arm control mechanism that is operably attached to the main support and the retaining arm, wherein the retaining arm control mechanism controls movement of the retaining arm with respect to the main support between an open configuration and a closed configuration, when in the closed configuration, the wheeled vehicle mounting system retains the wheel in a substantially stationary position with respect to the vehicle and wherein the retaining arm control mechanism comprises:
    - a mounting shaft operably attached to the main support, wherein the mounting shaft is rotatably mounted to the main support for rotation about a rotational axis of the mounting shaft;
    - a control arm attached to the mounting shaft; and
    - an engagement shaft operably attaching the mounting shaft to the retaining arm, wherein attachment of the engagement shaft to the mounting shaft is offset from the rotational axis.

11. The wheeled vehicle transportation system of claim 10, and further comprising a mounting bracket attached to the main support for attaching the wheeled vehicle mounting system to the vehicle, wherein the mounting bracket includes a mounting bracket recess that is adapted to receive a lower portion of the wheel.

12. The wheeled vehicle transportation system of claim 11, wherein the mounting bracket recess substantially restricts lateral movement of the wheel with respect to the mounting bracket when the lower portion of the wheel is in the mounting bracket recess.

13. The wheeled vehicle transportation system of claim 10, wherein the main support comprises a central section and a pair of side section that define the main support recess and wherein the main support recess substantially restricts lateral movement of the wheel with respect to the main support when the front portion of the wheel is in the main support recess.

14. The wheeled vehicle transportation system of claim 10, wherein the retaining arm comprises:
- two side panels in a spaced-apart configuration, wherein a distance between the side panels facilitates receiving a top portion of the wheel there between while substantially restricting lateral movement of the wheel with respect to the retaining arm when the top portion of the wheel is between the side panels; and
- at least one cross member that extends between the side panels.

15. The wheeled vehicle transportation system of claim 14, wherein the at least one cross member is attached to the two side panels above a lower surface of the two side panels so that the at least one cross member and the two side panels define a retaining arm recess.

16. The wheeled vehicle transportation system of claim 10, wherein the retaining arm has a length that is greater than about 50 percent of a diameter of the wheel.

17. The wheeled vehicle transportation system of claim 10, wherein a length of the engagement shaft is variable.

18. The wheeled vehicle transportation system of claim 10, and further comprising a locking mechanism that prevents the retaining arm from moving with respect to the main support.

* * * * *